United States Patent Office 3,260,590
Patented July 12, 1966

3,260,590
HERBICIDAL METHOD
Milton H. Fischer, Lyndonville, and Kenneth L. Hill, Middleport, N.Y., assignors to FMC Corporation, New York, N.Y., a corporation of Delaware
No Drawing. Filed Dec. 21, 1962, Ser. No. 246,363
3 Claims. (Cl. 71—2.6)

This invention relates to new herbicidal compositions, and particularly to a new method for the control of undesirable plant growth, both pre-emergently and post-emergently, by application of new and useful herbicidal compositions.

Specifically, this invention relates to herbicidal compositions containing methallyl N-(4-chloro-(2-methoxycarbonyl)phenyl)carbamate, a novel compound of the formula

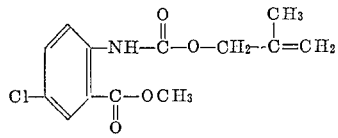

as an essential active ingredient. This compound, when formulated as an herbicidal composition, and applied either pre-emergently or post-emergently, has excellent herbicidal properties.

Methallyl N - (4-chloro-(2 - methoxycarbonyl)phenyl) carbamate may be prepared by known procedures for the synthesis of carbamates, such as the reaction of the appropriate chloroformate with the appropriate anthranilic ester, or addition of the appropriate alcohol to the appropriate isocyanate derived from the anthranilic ester. The anthranilic ester is readily prepared by reaction of the isatoic anhydride with alcohols, according to the procedure of Staiger and Miller, J. Org. Chem., 24, 1214–19 (1959). Several methods for the preparation of carbamates of anthranilic acids are known and have been described in the chemical literature; for example, by Barker et al., J. Chem. Soc., 874 (1948), and by Milone in U.S. Patent 2,522,383, issued Sept. 12, 1950.

The preparation of methallyl N-(4-chloro-(2-methoxycarbonyl)phenyl)carbamate is illustrated below:

*Example 1*

The intermediate methyl 2-amino-5-chlorobenzoate was prepared as follows: Ninety-nine grams of 6-chloroisatoic anhydride, 90 ml. of methanol, 1 g. sodium hydroxide were mixed and heated under reflux for forty-five minutes, during which time carbon dioxide was evolved. When evolution of carbon dioxide ceased, the methanol was removed under reduced pressure, to yield 89 grams (86% yield) of methyl 2-amino-5-chlorobenzoate, which on recrystallization from hexane yielded colorless needles, M.P. 76–78° C.

This product was reacted with methallyl chloroformate, as follows: Eighteen and six tenths grams of methyl 2-amino-5-chlorobenzoate, 12.1 grams of N,N-dimethylaniline and 100 ml. benzene were stirred, while 13.5 grams of methallyl chloroformate were added dropwise. The exothermic reaction was followed by a two-hour reflux period. The reaction mixture was then cooled, washed twice with dilute hydrochloric acid and with water, and dried. The residue was a yellow oil, which crystallized to yield 25.5 g. (94%) of methylyl N-(4-chloro-(2-methoxycarboynl)phenyl)carbamate, which on recrystallization from dilute ethanol formed colorless needles, M.P. 66–67° C.

For herbicidal applications, the methallyy N-(4-chloro-(2-methoxycarbonyl)phenyl)carbamate of this invention may be utilized in diverse formulations, including the adjuvants and carriers normally employed for facilitating the dispersion of active ingredients for agricultural applications, but recognizing the fact the formulation and mode of application of a toxicant may affect the activity of the material in a given application. Thus, the methallyl N-(4-chloro-(2 - methoxycarbonyl)phenyl)carbamate may be formulated as a granule of relatively large particle size, as a powderly dust, as a wettable powder, as an emulsifiable concentrate, as a solution, or as one of the less common types of formulations, depending on the desired mode of application. For pre-emergent application, these herbicidal compositions are usually applied either as sprays, dusts or granules in the area in which suppression of vegetatation is desired. For post-emergent control of the established plant growth, sprays or dusts are most commonly used. These formulations may contain as little as 0.5% or as much as 95% or more by weight of active ingredient.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. Since the instant toxicant is an oily liquid, an absorbent dust can accommodate high concentrations of active ingredient, if desired. A typical dust formulation, useful herein, is one containing 10.0 parts of methallyl N-(4-chloro-(2-methoxycarbonyl)phenyl)carbamate, 30.0 parts of bentonite clay and 60.0 parts talc.

Wettable powders, also useful formulations for both pre- and post-emergent herbicides, are in the form of finely divided particles which disperse readily in water or other dispersant. The wettable powder is ultimately applied to the soil either as a dry dust or as an emulsion in water or other liquid. Typical carriers for wettable powders include Fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing or emulsifying agent to facilitate dispersion. For example, a useful wettable powder formulation contains 25.0 parts of methallyl N-(4-chloro-(2 - methoxycarbonyl)phenyl)carbamate, 72.0 parts of bentonite clay and 1.5 parts each of sodium lignosulfonate and sodium laurysulfonate as wetting agents.

Other useful formulations for herbicidal application are the emulsifiable concentrates, which are homogeneous liquid or paste compositions which are readily dispersed in water or other dispersant, and may consist entirely of methallyl N-(4 - chloro-(2-methoxycarbonyl)phenyl)carbamate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprises 0.5 to 95 percent of active ingredient by weight of the herbicidal composition.

Typical wetting, dispersing or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1 percent to 15 percent by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The formulation and application of the herbicide of this invention is illustrated further in the following examples, wherein all parts and percentages are by weight:

*Example 2*

The pre-emergent herbicidal activity of methallyl N-(4-chloro-(2-methoxycarbonyl)phenyl)carbamate was demonstrated as follows: In flat pans was placed, to a depth of three inches, sterile sandy loam soil. In the soil were then planted seeds of pigweed, carrots, mustard, crabgrass, German hay millet, lamb's-quarter, dock, buckhorn plantain, and wheat, at a depth of one half inch, and seeds of lima beans, cucumber, corn and cotton at a depth of one and one half inches. As soon as the seeds were planted and the flats watered, the toxicant was applied in a granular formulation of 5% toxicant supported on 95% attapulgite clay of 24/48 mesh size, at a rate equal to 8 pounds of toxicant per acre. Both the treated flats and an untreated control were held in the greenhouse for three weeks, after which time the performance of the toxicant was assessed in terms of percent kill with respect to the untreated control.

The results, presented in Table 1 below, show that methallyl N - (4-chloro-(2-methoxycarbonyl)phenyl)carbamate shows excellent pre-emergent activity and selectivity:

TABLE 1.—PRE-EMERGENT HERBICIDAL ACTIVITY OF METHALLYL N-(4-CHLORO-(2-METHOXYCARBONYL) PHENYL)CARBAMATE

| Plant: | Percent kill |
|---|---|
| Wheat | 0 |
| Carrots | 0 |
| Cucumber | 0 |
| Corn | 0 |
| Lima beans | 0 |
| Cotton | 0 |
| Pigweed | 100 |
| Crabgrass | 100 |
| Lamb's-quarter | 100 |
| Mustard | 100 |
| Buckhorn plantain | 50 |
| German hay millet | 100 |
| Dock | 100 |

The utility and economic significance of this selectivity is apparent in considering the above table, where marked selective toxicity against various weedy grasses is observed, in the presence of economically important crops.

*Example 3*

Post-emergent herbicidal activity of methallyl N-(4-chloro-(2-methoxycarbonyl)phenyl)carbamate was demonstrated as follows: In sterile sandy loam soil were planted seeds of lima beans, corn, cotton and oats at a depth of one and one half inches, and seeds of flax, carrots, lettuce, mustard and crabgrass at a depth of one-half inch. The flats were watered, and the seeds allowed to grow in the greenhouse for about three weeks, the time required for the first trifoliate leaf to appear on the lima beans. Maintaining an untreated control, the stand of plants was then sprayed with a solution in aqueous acetone of methallyl N - (4 - chloro - (2-methoxycarbonyl)phenyl)carbamate, in a volume of acetone-water equivalent to 40 gallons per acre, at a rate equal to 8 pounds of toxicant per acre. The number of surviving plants were counted, and the percent kill with respect to the untreated control was determined. Results are presented in Table 2 below:

TABLE 2.—POST-EMERGENT HERBICIDAL ACTIVITY

| Plant: | Percent kill |
|---|---|
| Lima beans | 0 |
| Corn | 0 |
| Cotton | 40 |
| Flax | 100 |
| Oats | 0 |
| Carrots | 0 |
| Lettuce | 100 |
| Mustard | 100 |
| Crabgrass | 95 |

These data show the marked selectivity exhibited by this toxicant, with complete control of flax, lettuce and mustard in the presence of lima beans, corn, oats or carrots, and virtually complete control of crabgrass. The phytotoxic activity is accompanied by chlorophyll inhibition.

The herbicidal compositions of this invention may be formulated and/or applied with insecticides, fungicides, nematocides, plant growth regulators, fertilizers, and other agricultural chemicals. In applying the herbicide of this invention, whether formulated alone or with other agricultural chemicals, an effective amount and concentration of the toxicant methallyl N-(4-chloro-(2-methoxycarbonyl)phenyl)carbamate is of course employed.

It is apparent that various modifications may be made in the formulation and application of the herbicide of this invention, without departing from the novel concept herein, as defined in the following claims.

We claim:

1. The method of controlling undesired plant growth which comprises applying a herbicidal amount of methallyl N-(4-chloro-(2-methoxycarbonyl)phenyl)carbamate to the locus of the undesired plant growth.

2. The method of controlling undesired plant growth prior to emergence of said growth which comprises applying a herbicidal amount of methallyl N-(4-chloro-(2-methoxycarbonyl)phenyl)carbamate to the soil wherein this control of undesired plant growth is to be effected.

3. The method of controlling undesired plant growth after emergence of said growth from the soil which comprises applying a herbicidal amount of methallyl N-(4-chloro-(2-methoxycarbonyl)phenyl)carbamate to said undesired plant growth.

References Cited by the Examiner

UNITED STATES PATENTS

| 2,522,393 | 9/1950 | Milone | 260—471 |
| 2,556,437 | 6/1951 | Mowry et al. | 260—471 |
| 2,863,488 | 12/1958 | Short et al. | 260—471 |
| 2,980,728 | 4/1961 | Buck et al. | 260—471 |
| 3,031,292 | 4/1962 | Todd | 71—2.6 |
| 3,092,484 | 6/1963 | Salzberg | 71—2.6 |
| 3,100,226 | 8/1963 | Raman et al. | 71—2.6 X |

FOREIGN PATENTS 978,860  12/1964  Great Britain.

LEWIS GOTTS, *Primary Examiner.*

JULIAN S. LEVITT, JAMES O. THOMAS, Jr.,
*Examiners.*